United States Patent [19]

Forster

[11] Patent Number: 5,588,931
[45] Date of Patent: Dec. 31, 1996

[54] PLANETARY REDUCER AND WHEEL BEARING UNIT

[75] Inventor: Franz Forster, Karlstadt-Mühlbach, Germany

[73] Assignee: Linde Aktiengesellschaft, Germany

[21] Appl. No.: 271,144

[22] Filed: Jul. 6, 1994

[30] Foreign Application Priority Data

Jul. 14, 1993 [DE] Germany .................. 43 23 539.5

[51] Int. Cl.[6] ................ B60K 17/04; F16H 57/08
[52] U.S. Cl. ................... 475/338; 475/140; 180/372
[58] Field of Search ................... 475/140, 323, 475/331, 338; 180/369, 371, 372; 384/544; 301/6.5

[56] References Cited

U.S. PATENT DOCUMENTS

| | | | |
|---|---|---|---|
| 1,241,870 | 10/1917 | Megow | 475/338 |
| 2,941,423 | 6/1960 | Armington et al. | 475/338 |
| 3,179,195 | 4/1965 | Boudalon et al. | 475/140 X |
| 3,519,247 | 7/1970 | Christison | 475/140 X |
| 4,142,615 | 3/1979 | Sidles, Jr. et al. | 180/372 X |
| 4,162,713 | 7/1979 | Heitman et al. | 180/372 X |
| 4,275,616 | 6/1981 | Ehrlinger et al. | 475/72 |
| 4,662,246 | 5/1987 | Cheek et al. | 475/338 |
| 4,896,740 | 1/1990 | Hueckler et al. | 180/255 |
| 5,152,724 | 10/1992 | Scheiber et al. | 475/159 |

FOREIGN PATENT DOCUMENTS

| | | | |
|---|---|---|---|
| 2667374 | 4/1992 | France | 475/338 |
| 2843597 | 4/1980 | Germany | B60B 27/02 |
| 3826933A1 | 2/1990 | Germany | B60K 1/00 |
| 4236093 | 4/1993 | Germany | 180/372 |
| 1689126 | 11/1991 | U.S.S.R. | 180/372 |

*Primary Examiner*—Dirk Wright
*Assistant Examiner*—Khoi Q. Ta
*Attorney, Agent, or Firm*—Webb Ziesenheim Bruening Logsdon Orkin & Hanson, P.C.

[57] ABSTRACT

A motor vehicle integral speed reduction and wheel mounting unit having a driven rotatable axle pivot member with axially spaced annular bearings mounted on the outer surface. An annular fixed axle housing has an inner surface mounted on the bearings. A ring gear is formed on the axial portion of the inner surface of the axle housing located between the bearings. Intermediate shafts are rotatably mounted in the axle pivot member and a gear is fixed on each intermediate shaft. Each gear is located partially within a radial recess formed in the axle pivot member. One end of each intermediate shaft extends out of the axle pivot member and is connected to a drive shaft by a planet gear fixed on the end of the intermediate shaft.

25 Claims, 4 Drawing Sheets

PLANETARY REDUCER AND WHEEL BEARING UNIT

BACKGROUND OF THE INVENTION

1. Field of the Invention

The invention relates generally to an integral speed reduction and wheel mounting unit for a motor vehicle and, more particularly, to an integral speed reduction and wheel mounting unit including an axle pivot member, spaced annular bearings located on the axle pivot member and an axle housing mounted on the annular bearings so that either the axle pivot member or the axle housing can function as a driven hub.

2. Description of Related Prior Art

The prior art discloses many different arrangements of such units. For example, German Patent No. DE-OS 28 43 597 discloses a wheel bearing unit designed as a two-row annular bearing wherein the external bearing surfaces of the two rows of bearings are cast on the inside of the axle housing which is a stationary hub bracket and, therefore, also has a fastening flange cast thereon. This design provides a system having a relatively small number of component parts. However, the disadvantage of a wheel bearing unit according to this prior art design is that the torque amplification between the drive engine of the vehicle and the driven vehicle wheels takes place upstream of the wheel bearing unit and a separate transmission is required which significantly increases the amount of space required and the weight of the vehicle. Additionally, a wheel bearing unit according to this prior art design requires cost-intensive fabrication and installation operations. Moreover, the design requires the transmittal of large torques to the wheel by a transmission having complex and expensive shafts with universal joints.

U.S. Pat. No. 4,275,616 entitled "Hydraulic Wheel Drive" discloses a gear train inside a wheel drive on a machine tool. The design is completely different from the wheel bearing units of the prior art which are used in the mass production of motor vehicles. The axle housing is designed as a hub and is rotationally mounted on the axle pivot member which serves as the hub bracket. The end surface of the axle pivot member adjacent to the wheel is the stationary plate of a planetary gear train. The planetary gear train is an axial extension of the hub bracket which makes the arrangement quite long which requires a significant amount of space. Moreover, if the motor vehicle is equipped with dual tires a severe load is placed on the roller bearings since the lever arm on which the wheel forces are exerted is very long.

U.S. Pat. No. 4,896,740 entitled "Wheel Bearing Support" discloses a wheel head for the live front axle of a farm tractor in which the axle housing is rotationally mounted on a stationary axle pivot member. The inside of the rotating axle housing provides a ring gear of a step-down transmission between spaced roller bearings. The ring gear and thus the axle housing or hub are connected by an eccentrically located drive shaft and by two intermediate wheels mounted on the stationary axle pivot member or hub bracket. This design also occupies a great deal of space and, additionally, is restricted to use in a system in which the axle pivot member is stationary and the axle housing rotates.

SUMMARY OF THE INVENTION

The object of the invention is to provide an integral speed reduction and wheel mounting unit of the type described above, which is combined with a gear train in a compact and economical manner.

This object of the invention can be achieved by locating a ring gear on the inside of the axle housing between two spaced bearings and by having the ring gear engage at least one gear which is partly located in a radial recess formed in the axle pivot member and is non-rotationally connected to an intermediate shaft having both of its ends extending into the axle pivot member. At least one end of the intermediate shaft extends out of the axle pivot member and is operatively connected to a drive shaft which is coaxial with the axis of rotation of the integral speed reduction and wheel mounting unit. Accordingly, an essential aspect of the invention is to integrate torque amplification into the center of an integral speed reduction and wheel mounting unit. For this purpose, the advantages of an integral speed reduction and wheel mounting unit, such as small size, low weight and low cost, are retained while significant savings in size, weight and cost are achieved compared with prior art transmission and wheel bearing unit arrangements.

In the integral speed reduction and wheel mounting unit according to the invention, the axle housing can be a rotating hub, in which case the axle pivot member is the stationary hub bracket. However, the axle pivot member can be a rotating hub, in which case the axle housing is the stationary hub bracket. In one preferred embodiment of the invention, the axle pivot member is a rotating hub and the axle housing is a stationary hub bracket connected to the vehicle. This arrangement is compatible with conventional commercially available wheel bearing units.

The connection between the drive shaft and the intermediate shaft can be designed, for example, as a transmission. However, it is preferred that the drive shaft is a sun gear of a planetary gear train and engages with at least one planet gear which is fixed on the end of an intermediate shaft which extends out of the axle pivot member and forms a part of the planetary gear train. In this embodiment of the invention, there are two planet gears in the planetary gear train. One planet gear is engaged with the sun gear and the other planet gear is located partially within a recess formed in the axle pivot member and is engaged with a ring gear. The sun gear and the first planet gear form an adapter/converter gear train, which is upstream of the final gear train located between spaced annular bearings of the integral speed reduction and wheel mounting unit. This design has the advantage that the step-down in the final gear train can always be the same for various applications, because the total step-down can be changed by changing the step-down in the adapter/converter gear train. The sun wheel can be fixed on the drive shaft or it can be cast directly on the drive shaft. For ease of fabrication and installation, it is favorable if the annular ring gear is cast on the inner surface of the axle housing.

If the planetary gear train is designed as a train of toothed gears and the number of teeth of the two planet gears located in a common plane are different, the result is a one-and-one-half-stage planetary gear train.

In theory, the intermediate shaft can extend out of either axial ends of the axle pivot member with regard to the shortest possible most torsion-proof drive shaft. However, in the most favorable arrangement, the intermediate shaft only extends out of the end of the axle pivot member opposite the end adjacent the wheel. In this arrangement, the axle pivot member has high bending strength and torsional strength in the vicinity of the internal planet gears.

In another embodiment of the invention, a clutch mechanism is mounted on one end of the drive shaft. Depending upon the end of the axle pivot member from which the intermediate shaft extends, the clutch mechanism can be located internally or externally. In a particularly favorable arrangement, the intermediate shaft extends out of the end of the axle pivot member adjacent to the wheel and the drive shaft passes axially through the center of the axle pivot member. The intermediate shaft and the drive shaft are operatively connected on the end of the axle pivot member adjacent to the wheel and the clutch mechanism is located between the drive shaft and the axle pivot member. The clutch mechanism and the adapter/converter gear train are easily accessible for service and maintenance.

The clutch mechanism is a hydraulically-operated, multiple-toroid, spring-brake system located in a bracket which can be bolted, along with a wheel rim, to the axle pivot member. The clutch mechanism is easily accessible after the removal of the wheel rim. The clutch mechanism requires no projecting fluid lines or actuating cables which avoids exposure to potential damage and corrosive influences. The drive shaft is formed with a longitudinal axial passage for supplying a pressure medium to the multi-toroid brake mechanism.

In one aspect of the invention, the bearings are annular ball bearings with the same nominal diameter in order to achieve the widest possible bearing base.

In order to reduce the number of components to be assembled, the outer race of each bearing is cast integrally on the inner surface of the axle housing. For this purpose, when the axle housing functions as the hub bracket, a radially extending annular mounting flange is cast on the outer surface.

An extremely compact design, in which the integral speed reduction and wheel mounting unit has only a few components, is achieved if the outer races of the bearings; the ring gear of the planetary gear train; and the mounting flange are all cast on appropriate surfaces of the axle housing.

A complete understanding of the invention will be obtained from the following description when taken in connection with the accompanying drawing figures wherein like reference characters identify like parts throughout.

DETAILED DESCRIPTION OF THE PREFERRED EMBODIMENTS

Figure 1:
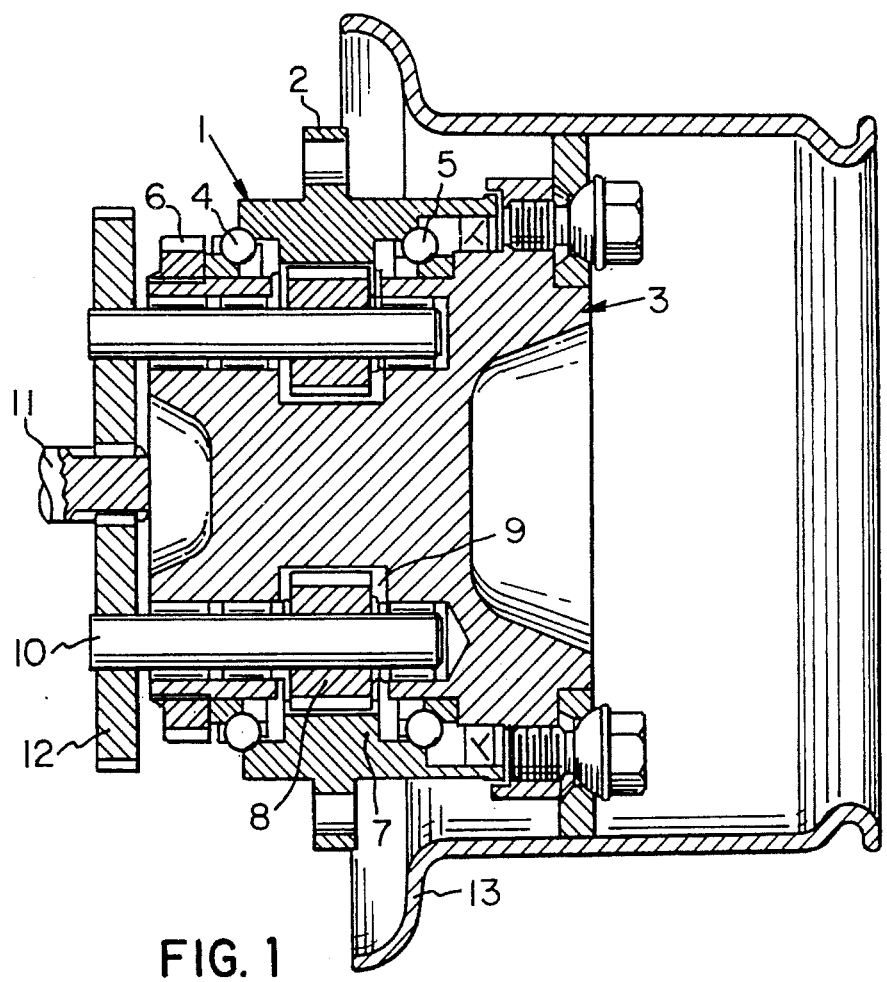
FIG. 1 is a longitudinal section through an integral speed reduction and wheel mounting unit according to the invention.

With reference to FIG. 1 of the drawings, the integral speed reduction and wheel mounting unit according to the invention has an axle housing 1 which functions as rotatable hub or a stationary hub bracket and is provided on its outer surface with an annular mounting flange 2 having spaced bolt holes formed therein. An axle pivot member 3 is rotationally mounted within axle housing 1 by two axially spaced annular roller bearings 4 and 5. The outer annular races of bearings 4 and 5 are cast on axle housing 1, and the inner races of bearings 4 and 5 are formed by annular rings mounted on the exterior surface of axle pivot member 3. The annular roller bearings can be axially adjusted in relation to one another on the axle bearing member by a bearing nut 6 which is threaded on the exterior surface of one end of the axle pivot member.

A ring gear 7 is located between bearings 4 and 5 and is preferably cast integrally on the inner surface of axle housing 1. Ring gear 7 engages with planet gears 8 which are partially located in pocket-shaped radial recesses 9 formed in axle pivot member 3. Each planet gear 8 is fixed on an intermediate shaft 10 which is rotatably mounted in axle pivot member 3. One end of each intermediate shaft extends out of axle pivot member 3 on the end of the axle pivot member opposite wheel rim 13. The outer end of each intermediate shaft 10 is operatively connected to a drive shaft 11 by a planet gear 12 which is fixed to the shaft. Drive shaft 11 functions as a sun gear in a one-and-one-half stage planetary gear train which drives planet gears 12 which are fixed on intermediate shafts 10. Gears 8 located in recesses 9 form second planet gears, which are connected to the same shafts as planet gears 12. The sun gear and planet gears 12 form an adapter/converter gear train, while gears 8 which rotate in synchronization with planet gears 12 and ring gear 7 form a final gear train. This gear train combination is called a one-and-one-half-stage planetary gear train. The planetary gear train preferably includes three planet gears 12 and three planet gears 8.

The integral speed reduction and wheel mounting unit according to the invention operates according to the following. Drive shaft or sun gear 11 drives planet gears 12 and thus intermediate shafts 10. Gears 8 are fixed on intermediate shafts 10 and engage ring gear 7 so that as axle pivot member or hub 3 in which intermediate shafts 10 are mounted is rotated, the wheel which is bolted to the axle pivot member also rotates. FIG. 1 shows only the rim 13 of the wheel.

The integral speed reduction and wheel mounting unit according to the invention results in both a reduction of the speed and an amplification of the torque transmitted by drive shaft 11. The arrangement illustrated in FIG. 1 is suitable for a reduction ratio between the rotary speed of drive shaft 11 and the rotary speed of the wheel of approximately 16:1.

Figure 2:
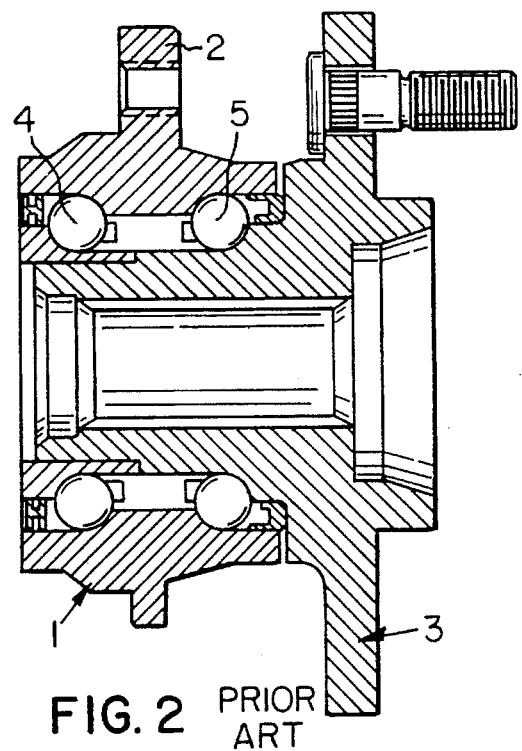
FIG. 2 is a longitudinal section through a unit according to the prior art.

FIG. 2 of the drawings shows a prior art driven unit without torque amplification which is designed for the same rim diameter as the integral speed reduction and wheel mounting unit of the invention illustrated in FIG. 1 of the drawings. The dimensions of the integral speed reduction and wheel mounting unit according to the invention are essentially the same as the dimensions of a unit of the prior art without torque amplification, particularly in the radial direction. The load-bearing capacity is thereby equivalent, because the annular bearings in the integral speed reduction and wheel mounting unit according to the invention, although they have smaller dimensions, are located on a bearing race which has a larger diameter. A comparison of FIG. 1 with FIG. 2 also shows that when an equal torque is delivered to the wheel, a significantly smaller diameter drive shaft is necessary in the wheel bearing unit according to the invention, which is both compact and lightweight.

Figure 3:
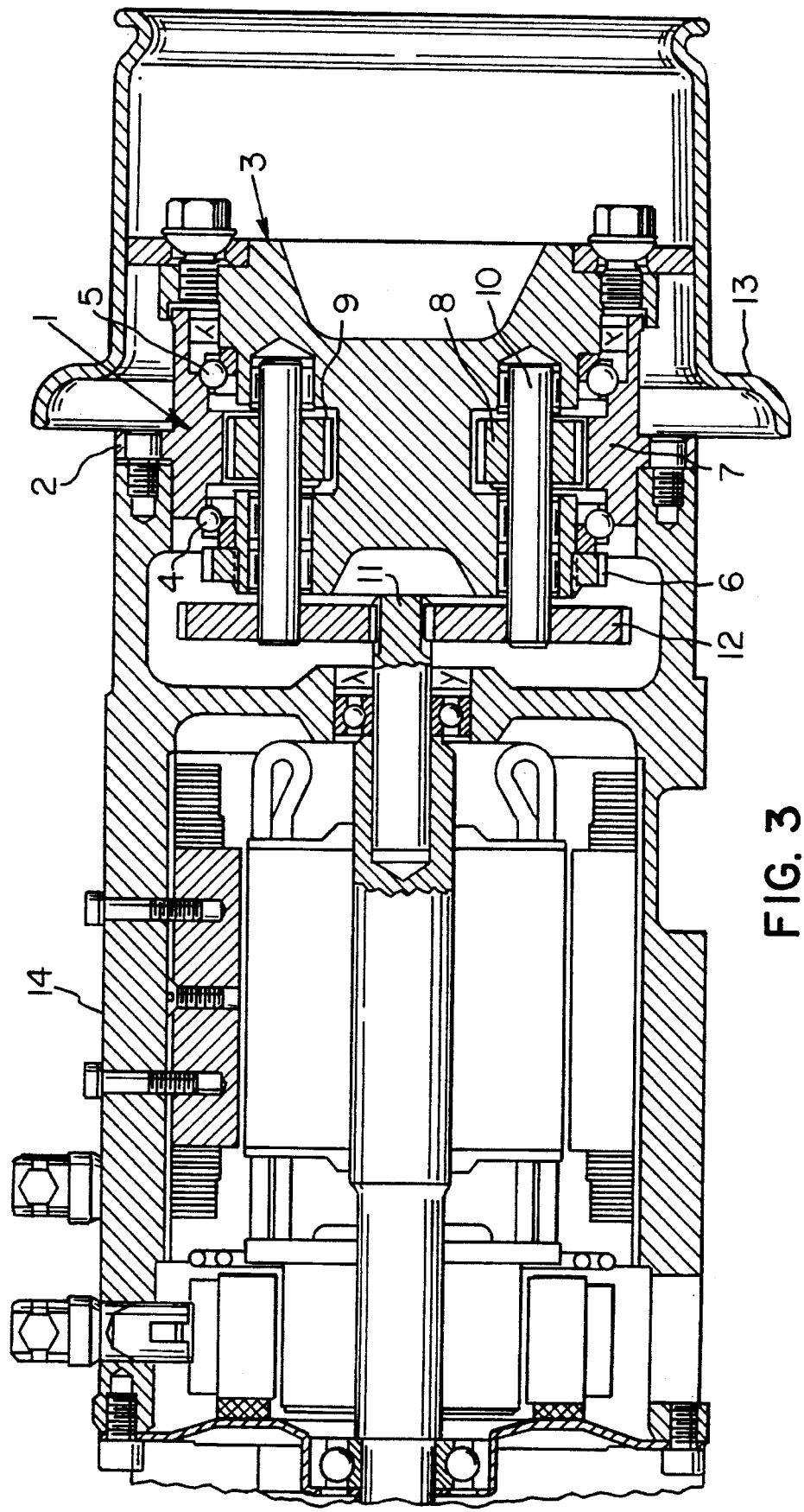
FIG. 3 is the integral speed reduction and wheel mounting unit shown in FIG. 1 and a longitudinal section through an electrically driven live axle.

FIG. 3 of the drawings shows an integral speed reduction and wheel mounting unit according to the invention connected as the final power take-off of an electrically-driven live axle 14. As a result of the extremely compact design of the wheel bearing unit, it is possible to use large electric motors in a relatively small space which provides an electrically-driven live axle with a higher power density. An integral speed reduction and wheel mounting unit according to the invention can also be connected to other drive systems.

Figure 4:
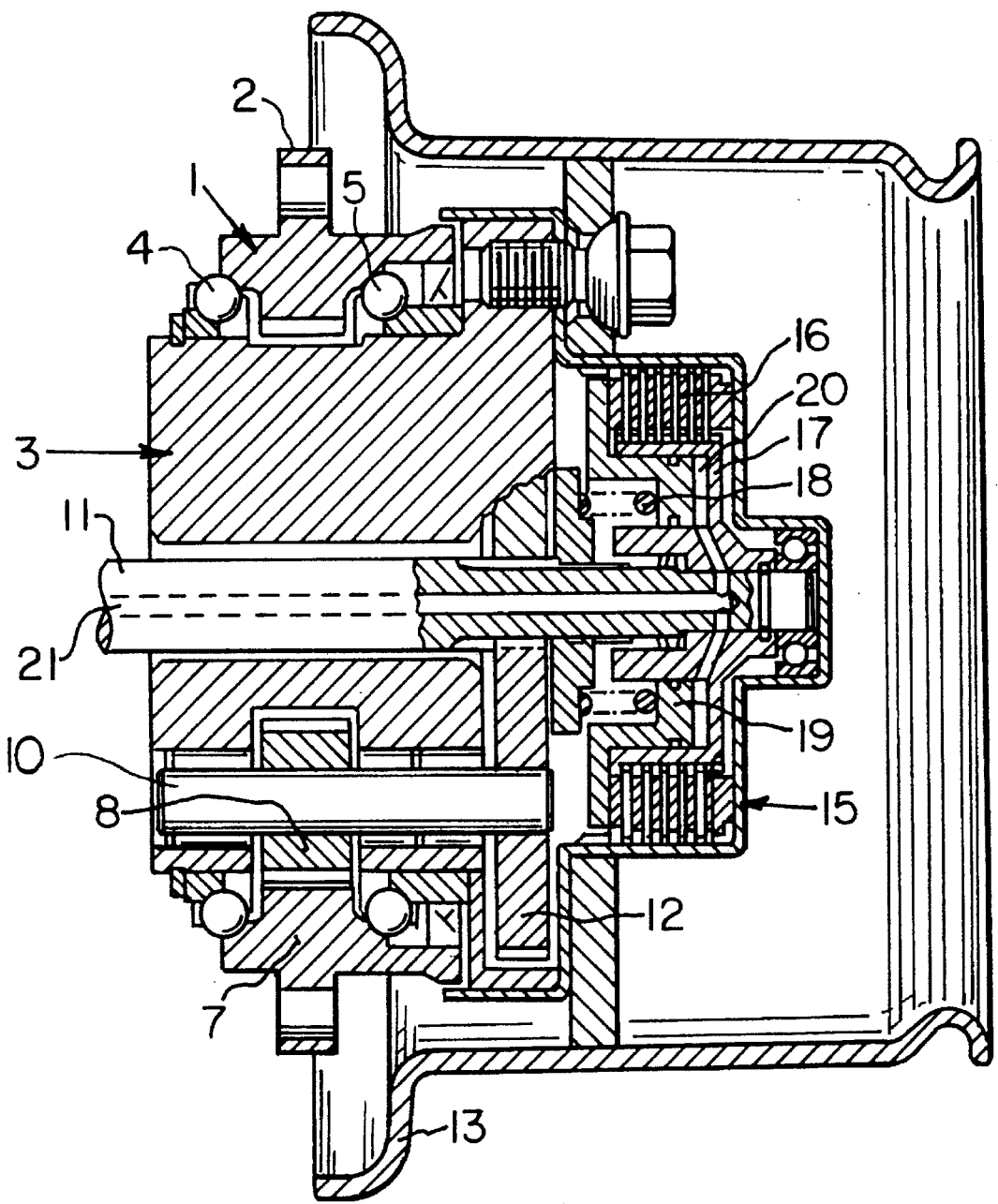
FIG. 4 is a longitudinal section of a second embodiment of an integral speed reduction and wheel mounting unit according to the invention.

FIG. 4 of the drawings shows a second embodiment of an integral speed reduction and wheel mounting unit according to the invention wherein a clutch mechanism is located between drive shaft 11 and axle pivot member or hub 3. Intermediate shafts 10 are located on the end of the axle pivot member adjacent to the wheel, i.e., the outer end, and they extend out of the axle pivot member to mount planet gears 12. A bracket 15 is bolted onto axle pivot member 3 along with wheel rim 13. Of course, it is also possible to connect bracket 15 to axle pivot member 3 by its own independent fastening means. Multiple annular members 16 are fastened in bracket 15 in a non-rotating fashion so that they can move longitudinally axially in relation to the brake bracket and to a disc bracket 17 non-rotationally fastened to drive shaft 11. The multiple annular members 16 are pressurized against the force of a coil spring 18 by a hydraulic piston 19. A pressure chamber 20 is provided for pressurized fluid supplied through a longitudinal control passage 21 in drive shaft 11 to actuate piston 19. The multiple annular members and the adapter/converter gear train formed by the sun gear and planet gears 12 operate in an oil bath.

Figure 5:
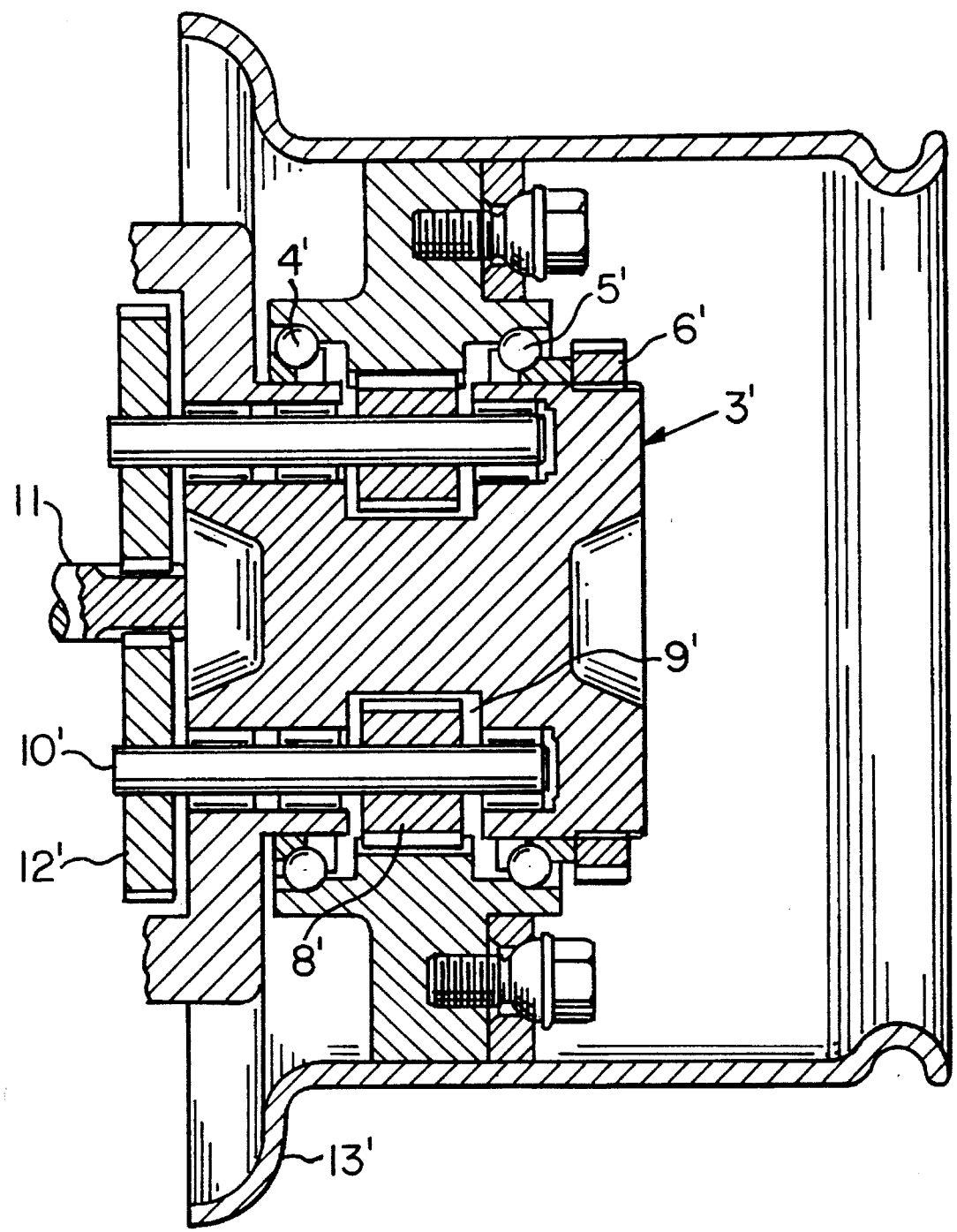
FIG. 5 is a longitudinal section of a third embodiment of a unit according to the invention.

FIG. 5 of the drawings shows a third embodiment of a unit according to the invention wherein the member 3' functions as a stationary hub bracket and the wheel rim 13' is bolted to the outer annular member which functions as a rotating hub. Bearings 4' and 5' which are axially spaced along the member 3' mount the rotary hub on the stationary hub bracket 3'. A bearing nut 6' is threaded onto the free end of the stationary hub bracket 3' to hold the rotating hub in place against the bearings 4' and 5'. A ring gear is located on the rotating hub between bearings 4' and 5' and is preferably cast on the inner surface of the rotating hub. The ring gear engages planet gears 8' which are partially located in pocket-shaped radial recesses 9' formed in the stationary hub bracket 3'. Each planet gear 8' is fixed on an intermediate shaft 10' and a planet gear 12' is fixed on the outer end of each intermediate shaft 10'. The planet gears 12' are driven by drive shaft 11 which functions as a sun gear.

While embodiments of the invention have been described in detail herein, it will be appreciated by those skilled in the art that various modifications and alternatives to the embodiments could be developed in light of the overall teachings of the disclosure. Accordingly, the particular arrangements are illustrative only and is not limiting as to the scope of the invention which is to be given the full breadth of the appended claims and any and all equivalents thereof.

I claim:

1. An integral speed reduction and wheel mounting unit adapted to support a wheel on a motor vehicle, said unit comprising an axle pivot member having an outer surface, axially spaced annular bearings mounted on said outer surface of said axle pivot member, an annular axle housing having an inner surface mounted on said axially spaced bearings, whereby said axle pivot member is a driven member, a ring gear formed on said inner surface of said axle housing located between said axially spaced bearings, at least one intermediate shaft rotatably mounted in said axle pivot member, at least one radial recess formed in said axle pivot member and a planet gear fixed on said at least one intermediate shaft located partially within said radial recess and meshing with said ring gear, one end of said at least one intermediate shaft extending out of said axle pivot member and means for operatively connecting said one end of said at least one intermediate shaft to a drive shaft coaxial with the axis of rotation of said axle pivot member, whereby rotation of said at least one intermediate shaft rotates said axle pivot member relative to said annular axle housing.

2. An integral speed reduction and wheel mounting unit as set forth in claim 1 wherein said axle housing includes a radially extending annular external mounting ring adapted to be fastened to a vehicle, and wherein said axle pivot member is a rotating hub.

3. An integral speed reduction and wheel mounting unit as set forth in claim 1 wherein said means for operatively connecting said one end of said at least one intermediate shaft to a drive shaft is a planet gear fixed on said at least one end of said intermediate shaft extending out of said axle pivot member for operative connection with a drive shaft, whereby the drive shaft functions as the sun gear of a planetary gear train.

4. An integral speed reduction and wheel mounting unit as set forth in claim 2 wherein said means for operatively connecting said one end of said at least one intermediate shaft to a drive shaft is a planet gear fixed on said one end of said intermediate shaft extending out of said axle pivot member for operative connection with a drive shaft, whereby the drive shaft functions as the sun gear of a planetary gear train.

5. An integral speed reduction and wheel mounting unit as set forth in claim 1 wherein said ring gear is formed on said inner surface of said axle housing.

6. An integral speed reduction and wheel mounting unit as set forth in claim 2 wherein said ring gear is formed on said inner surface of said axle housing.

7. An integral speed reduction and wheel mounting unit as set forth in claim 3 wherein said ring gear is formed on said inner surface of said axle housing.

8. An integral speed reduction and wheel mounting unit as set forth in claim 1 wherein said one end of said at least one intermediate shaft extends out of the end of said axle pivot member spaced from a wheel.

9. An integral speed reduction and wheel mounting unit as set forth in claim 2 wherein said one end of said at least one intermediate shaft extends out of the end of said axle pivot member spaced from a wheel.

10. An integral speed reduction and wheel mounting unit as set forth in claim 3 wherein said one end of said at least one intermediate shaft extends out of the end of said axle pivot member spaced from a wheel.

11. An integral speed reduction and wheel mounting unit as set forth in claim 4 wherein said one end of said at least one intermediate shaft extends out of the end of said axle pivot member spaced from a wheel.

12. An integral speed reduction and wheel mounting unit as set forth in claim 1 including adjustable coupling means extending between a drive shaft and said axle pivot member for varying the rotational speed of said axle pivot member.

13. An integral speed reduction and wheel mounting unit as set forth in claim 2 including adjustable coupling means extending between a drive shaft and said axle pivot member for varying the rotational speed of said axle pivot member.

14. An integral speed reduction and wheel mounting unit as set forth in claim 3 including adjustable coupling means extending between a drive shaft and said axle pivot member for varying the rotational speed of said axle pivot member.

15. An integral speed reduction and wheel mounting unit as set forth in claim 4 including adjustable coupling means extending between a drive shaft and said axle pivot member for varying the rotational speed of said axle pivot member.

16. An integral speed reduction and wheel mounting unit as set forth in claim 5 including adjustable coupling means extending between a drive shaft and said axle pivot member for varying the rotational speed of said axle pivot member.

17. An integral speed reduction and wheel mounting unit as set forth in claim 1 wherein said one end of said at least one intermediate shaft extends out of the end of said axle pivot member close to a wheel and including a drive shaft extending through the center of said axle pivot member, and means for operatively connecting said intermediate shaft and said drive shaft on the end of said axle pivot member close to a wheel, and further including adjustable coupling means mounted on said drive shaft between said drive shaft and said axle pivot member for controlling the speed of rotation of said axle pivot member.

18. An integral speed reduction and wheel mounting unit as set forth in claim 2 wherein said one end of said at least one intermediate shaft extends out of the end of said axle pivot member close to a wheel and including a drive shaft extending through the center of said axle pivot member, and means for operatively connecting said intermediate shaft and said drive shaft on the end of said axle pivot member close to a wheel, and further including adjustable coupling means mounted on said drive shaft between said drive shaft and said axle pivot member for controlling the speed of rotation of said axle pivot member.

19. An integral speed reduction and wheel mounting unit as set forth in claim 3 wherein said one end of said at least one intermediate shaft extends out of the end of said axle pivot member close to a wheel and including a drive shaft extending through the center of said axle pivot member, and means for operatively connecting said intermediate shaft and said drive shaft on the end of said axle pivot member close to a wheel, and further including adjustable coupling means mounted on said drive shaft between said drive shaft and said axle pivot member for controlling the speed of rotation of said axle pivot member.

20. An integral speed reduction and wheel mounting unit as set forth in claim 4 wherein said one end of said at least one intermediate shaft extends out of the end of said axle pivot member close to a wheel and including a drive shaft extending through the center of said axle pivot member, and means for operatively connecting said intermediate shaft and said drive shaft on the end of said axle pivot member close to a wheel, and further including adjustable coupling means mounted on said drive shaft between said drive shaft and said axle pivot member for controlling the speed of rotation of said axle pivot member.

21. An integral speed reduction and wheel mounting unit as set forth in claim 17 wherein said adjustable coupling means includes a plurality of axially shiftable annular members and hydraulically-actuated, spring-loaded means for axially shifting said annular members, a brake bracket, and means for attaching said brake bracket to said axle pivot member.

22. An integral speed reduction and wheel mounting unit as set forth in claim 21 wherein said drive shaft has a longitudinal axial passage formed therein for supplying a pressure medium to said hydraulically-actuated, spring-loaded means to counteract the force of said spring-loaded means.

23. An integral speed reduction and wheel mounting unit as set forth in claim 21 wherein each of said annular bearings includes a plurality of ball bearings having substantially the same diameter.

24. An integral speed reduction and wheel mounting unit as set forth in claim 1 wherein the outer race of each of said annular bearings is formed on the inner surface of said axle housing.

25. An integral speed reduction and wheel mounting unit adapted to support a wheel on a motor vehicle, said unit comprising an axle pivot member having an outer surface, axially spaced annular bearings mounted on said outer surface of said axle pivot member, an annular axle housing having an inner surface mounted on said axially spaced bearings, whereby said annular axle housing is a driven member, a ring gear formed on said inner surface of said annular axle housing located between said axially spaced bearings, at least one intermediate shaft rotatably mounted in said axle pivot member, at least one radial recess formed in said axle pivot member and a planet gear fixed on said at least one intermediate shaft located partially within said radial recess and meshing with said ring gear, one end of said at least one intermediate shaft extending out of said axle pivot member and means for operatively connecting said one end of said at least one intermediate shaft to a drive shaft coaxial with the axis of rotation of said annular axle housing, whereby rotation of said at least one intermediate shaft rotates said annular axle housing relative to said axle pivot member.

* * * * *